June 17, 1969 A. O. LINDSAY ET AL 3,449,867
WORK GUIDE MEANS FOR CENTERLESS GRINDING MACHINES
Filed Oct. 10, 1966
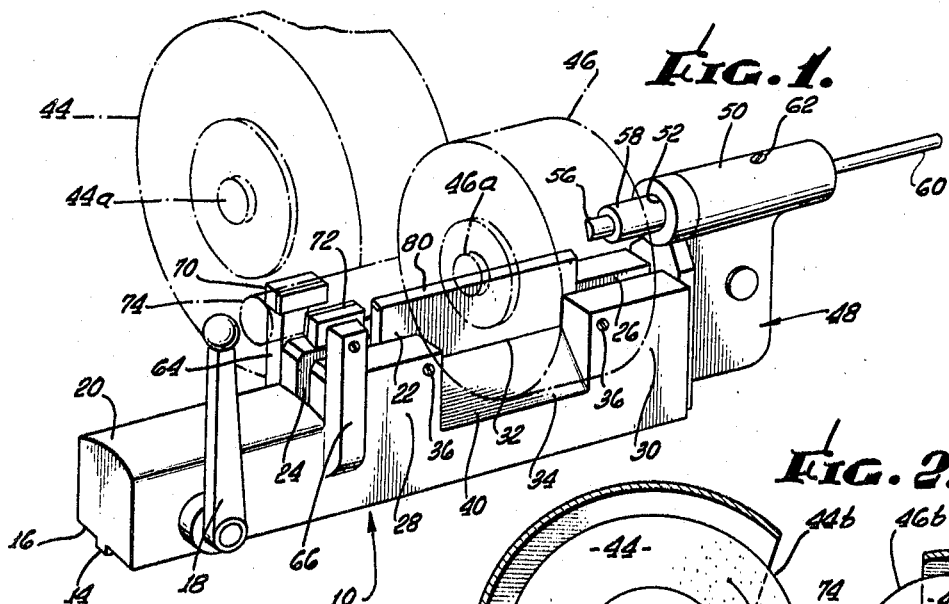
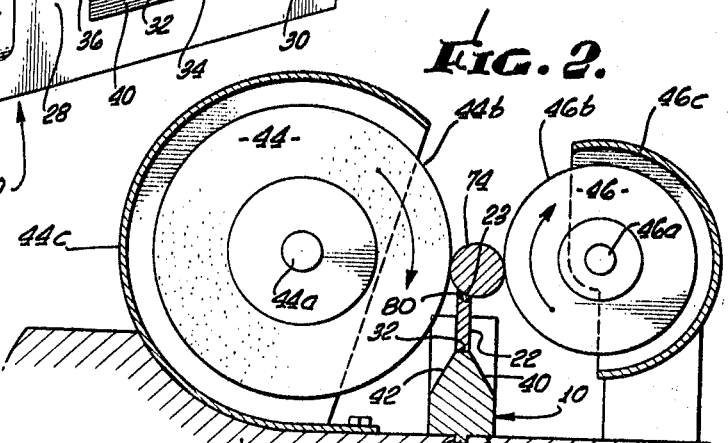
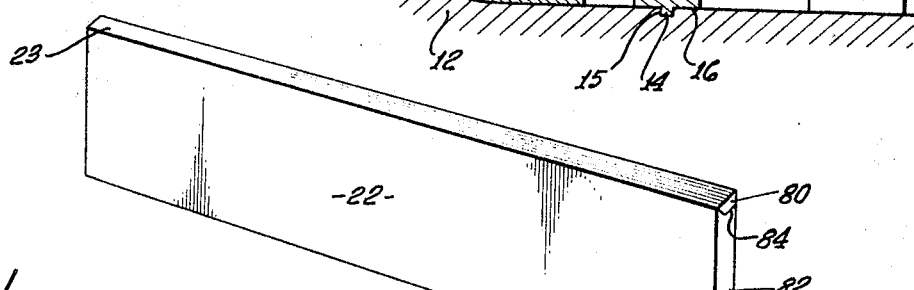
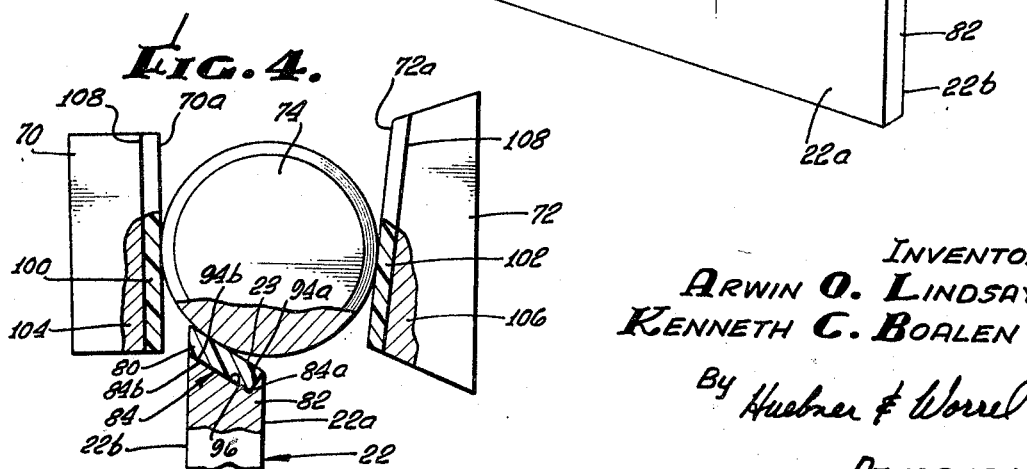
INVENTORS.
ARWIN O. LINDSAY
KENNETH C. BOALEN
By Huebner & Worrel
ATTORNEYS.

United States Patent Office 3,449,867
Patented June 17, 1969

3,449,867
WORK GUIDE MEANS FOR CENTERLESS GRINDING MACHINES
Arwin O. Lindsay, 13445 Oscar St., Sylmar, Calif. 91345, and Kenneth C. Boalen, 1839A Verdugo Loma Drive, Glendale, Calif. 91208
Filed Oct. 10, 1966, Ser. No. 589,179
Int. Cl. B24b 5/18, 5/34
U.S. Cl. 51—103                 5 Claims

ABSTRACT OF THE DISCLOSURE

Work guide means for use in a centerless grinding machine including a wearing portion and a base portion, wherein the wearing portion of said work guide means is material of relatively low porosity and high density, and the base portion of said work guide means is a relatively flexible, shock absorbing material wherein vibrations transmitted to said guide means from said centerless grinding machine will be dampened.

---

This invention relates to work guide means for use in centerless grinding machines, and more particularly to work blades and work guides having both wear resistant surfaces and shock absorbing and vibration damping properties.

Prior to this invention, work blades and work guides for use in centerless grinding machines were composed of steel, carbide tipped steel, dense cast iron, or the like. Such blades and work guides have been unsatisfactory for the following reasons. Prior art work blades and guides having a high density have been prone to excessive vibration and chatter, and a high transfer of kinetic energy. Carbide tipped blades must be made in sections, creating irregularities in the blade surface where the carbide tipping sections join. However, blades and guides of a relatively lower density, although tending to lessen vibration and chatter, have been unsatisfactory due to the uneven and rapid wear of the blade or guide surface.

Since the work blades and guides to which this invention relates serve to orient a work piece within the centerless grinding machine and to prevent lateral motion of the work piece therein, it is important that the wearing surface of the work blade or guide be relatively fixed within the machine, that they be vibration and chatter free, and that they wear at an even rate throughout their working surface in order that the work piece be kept in a stable position while it is being finished.

It is therefore an object of this invention to provide a work blade and work guides for use in a centerless grinding machine having smooth, continuous wear surfaces.

It is another object of this invention to provide a work blade and work guides wherein excessive vibration and chatter are damped when in operation.

It is a further object of this invention to provide a work blade and work guides wherein the transfer of kinetic energy by the blade and guides is kept to a minimum.

It is a still further object of this invention to provide a work blade and work guides in which uneven and excessive wear of the working surfaces of the work blade and guides is reduced.

Further objects and many of the attendant advantages of the present invention will become apparent from a detailed consideration of the following description and drawings wherein like numerals indicate like parts throughout the views, and in which:

FIGURE 1 is a perspective view of an infeed work rest to be mounted in a centerless grinding machine showing a work blade and lateral work guides mounted thereon and, in phantom, a work piece carried thereby and the grinding and regulator wheels of the grinding machine;

FIGURE 2 is a cross-sectional view of a work blade mounted on an infeed work rest and illustrating a work piece positioned on a work blade between a grinding wheel and a regulating wheel of a centerless grinding machine, a fragmented portion only of which is shown;

FIGURE 3 is a perspective view of a work blade per se; and

FIGURE 4 is an end elevational, partly cross-sectional view of a work piece resting on a work blade between lateral work guides.

Referring to the drawings, and particularly to FIGURES 1 and 2 an infeed work rest 10 is mounted in a conventional centerless grinding machine 12 (only a portion of which is shown). This infeed work rest 10 is an elongated structure formed with a tongue 14 extending the full length of the generally flat bottom 16 thereof, and centrally protruding therefrom. Tongue 14 is adapted to be mounted in a mating slot 15 of the grinding machine 12, so as to permit longitudinally slidable movement of the infeed work rest 10 thereon. The amount of slidable movement is controlled by suitably adjusting a rotatably mounted control arm 18, which extends from the side of a reduced end portion 20 of the work rest 10.

In order to provide a mount for a generally flat sided work blade 22 having a length greater than its height and height greater than its width and formed with a slanted wearing surface 23, which is a part of the work guide means, longitudinally aligned, parallel-faced slots 24 and 26, that are slightly wider than the width of blade 22, are cut centrally down through the entire top surface of a pair of spaced raised shoulder portions 28 and 30 which form a middle section and the end opposite from end portion 20, respectively, of work rest 10. The slots 24 and 26 have floors which are in the same plane as the flattened top surface 32 of a recessed portion 34 of work rest 10, formed in the space between raised shoulder portions 28 and 30 thereof. Top surface 32 is approximately the width of blade 22, and shorter than the length of blade 22, so that blade 22 can be fitted between shoulders 28 and 30 in slots 24 and 26, and rest on the floor portions thereof and on the top surface 32 of recessed portion 34. Blade 22 is secured in place by tightening set screws 36, which are threaded through holes in the sides of shoulders 28 and 32 to bear against the sides 22a and 22b of blade 22.

The recessed portion 34 of work rest 10, between raised shoulder portions 28 and 30, is formed with wheel relief sections 40 and 42, which slope down and outwardly from top surface 32, and provide room for the positioning of a disc-shaped grinding wheel 44, and a disc-shaped regulator wheel 46, adjacent to and on opposite sides of blade 22. Grinding wheel 44 and regulator wheel 46 are mounted for rotation about axles 44a and 46a and have circumferential outer working surfaces 44b and 46b, respectively, which are parallel to the wearing surface 23 of blade 22. Wheels 44 and 46 are conventionally carried and powered by suitable motors (not shown) in the grinding machine 12 and partly covered by curved spaced hoods 44c and 46c, respectively.

A stop element housing 48 is secured to the end of work rest 10 adjacent to the shoulder portion 32 thereof. An upper cylindrical holder portion 50 of housing 48 is formed with a cylindrically shaped hollow interior 52 extending therethrough along an axis generally parallel with the longitudinal axis of blade 22 and positioned slightly above the wearing surface 23 thereof. A short, generally cylindrical stop element 56 extends into hollow interior 52 and is secured in a hollow cylindrical stop element holder 58 fitted within the hollow interior 52 of housing 48. The stop element 56 protrudes from the end of housing 48 which is adjacent to blade 22. An elongated adjusting rod 60 extends into the hollow interior 52, from the end opposite from that in which stop element 56 is mounted, and bears against the portion of stop element 56 therein so as to be able to positionally adjust element 56. When stop element 56 is moved to the desired position by rod 60, a set screw 62, threaded through the cylindrical portion 50 into the interior 52 thereof, can be tightened to bear against rod 60 and hold it in place.

A pair of supporting arms 64 and 66 extend up from the opposite sides of raised shoulder 28 to provide mounts for a pair of opposing lateral work guides 70 and 72, respectively. The work guides 70 and 72 are formed as tetrahedral blocks with their generally upright opposing wearing faces 70a and 72a each in planes parallel to the longitudinal axis of blade 22 and disposed sufficiently above the wearing edge 23 of blade 22 that the projected axis of stop element 56 would pass between them.

When a work piece 74, which is shown as an elongated cylindrical rod, is placed in position to be ground, the infeed work rest 10 is adjusted so that one end of the work piece 74 bears against the free end of stop element 56, the bottom rests on the wearing surface 23 of blade 22, and the opposing wearing faces 70a and 72a of lateral work guides 70 and 72, respectively, bear against the sides of work piece 74 sufficiently to prevent lateral movement, but loose enough to allow axial rotation. Then, when grinding wheel 44 and regulator wheel 46 are adjusted to bear against the sides of work piece 74, and are rotated so as to grind it, work piece 74 will be held in position relative thereto by the aforementioned guide means.

The work blade 22 is formed with a relatively dense and hard wearing portion 80 which provides wearing surface 23, and a less dense and relatively more flexible major base portion 82 upon which wearing portion 80 is mounted. A very dense wearing portion 80 is required to prevent metal dust from the work piece 74 being ground from accumulating in the pores thereof. Irregularities are caused in the finished work piece by such a metal dust buildup. A hard wearing surface is also desirable to give the blade a reasonably long life and to insure that it will wear at a constant rate and thus insure that the work piece 74 will be kept on center while it is being ground.

In the preferred embodiment of the work blade 22, best viewed in FIGURE 3, the wearing portion 80 is a ceramic material. It has the desired properties of denseness, low porosity and wearability, as well as being chip resistant and easily cut into the desired shape. Also, the use of a ceramic material means that the wearing portion 80 can be one solid piece, rather than several sections, as are carbide tipped blade known previously in the art. The properties of a suitable ceramic are as follows:

| Property (unit): | Value |
| --- | --- |
| Water absorption (percent) | Impervious |
| Specific gravity | 3.58 |
| Density (lbs./in.$^3$) | .129 |
| Max. safe temp. (° C.) | 1500 |
| Hardness, Rockwell 45 N | 74 |
| Coef. ther. exp. (° C., 25–300° C.) | $6.2 \times 10^{-6}$ |
| Tensile strength (lbs./in.$^2$) | 20,000 |
| Composition strength (lbs./in.$^2$) | 315,000 |
| Flexural strength (lbs./in.$^2$) | 46,000 |
| Impact resistance (inch/lbs.) | 6.5 |

The base portion 82 is preferably a paper based phenolic plastic. This material employs a paper base bonded by a phenol formaldehyde resin of electrical grade. It is relatively less dense and more flexible than the ceramic and more shock absorbing. The combination of the ceramic wearing portion 80 with a paper phenolic base portion 82 provides a work blade 22 having a hard, smooth, long-lasting wearing surface 23, while the relative flexibility of the base keeps vibration, chatter, and transfer of kinetic energy to a minimum. The properties of a suitable phenolic are as follows:

Physical properties

| | |
| --- | --- |
| Specific gravity | 1.36. |
| Ther. cond., cal./sec./cm.$^2$/° C./cm. | $7.0 \times 10^4$. |
| Coef. of ther. exp., cm./cm./° C. | $2.0 \times 10^{-5}$. |
| Spec. heat, B.t.u./lb./° F. | 0.35 to 0.40. |
| Water absorption | .55%/24 hr. period submerged. |

Mechanical properties

| | |
| --- | --- |
| Hardness, Rockwell | M 105. |
| Tensile, str., 1000 p.s.i. | 16 lengthwise; 13 crosswise. |
| Flex. str., 1000 p.s.i. | Flat min.; 15 lengthwise; 14 crosswise. |
| Comp. str., 1000 p.s.i. | 34 flat; 23 edge. Condition A–E–48/50, .40 lengthwise, .35 crosswise. |
| Max. oper. temp., ° F. | Continually 250–275; ½ hr. run 275–300. |

Chemical resistance

This phenolic is highly resistant to all machining coolants.

In the preferred embodiment of our work blade, an angular relief groove 84 is cut in the upper end of the paper phenolic base portion 82 and runs the entire length thereof. The relief groove 84 is formed by a short wall 84a, steeply angled from the side 22a of blade 22, and a longer, lesser angled wall 84b cut from side 22b of blade 22 perpendicular to wall 84a.

The wearing portion 80 is shown as an elongated flat-sided strip of ceramic material formed with a short side 94a complementary to wall 84a, an adjoining bottom 94b perpendicular to short side 94a and complementary to wall 84b, a top surface which is the wearing surface 23 adjoining the edge of short side 94a opposite from bottom 94b, and parallel to bottom 94b and another short side 94c opposite from short side 94a, and extending between wearing surface 23 and bottom 94b and parallel to the sides 22a and 22b of base portion 82 when mounted therein. Preferably an epoxy resin adhesive 96 is used to secure wearing portion 80 to base portion 82 so that short side 94a and bottom 94b abut walls 84a and 84b, respectively.

The main vector force created by the work piece 74 bearing against and rotating on wearing surface 23 is directed in a line perpendicular to walls 84b and 94b. A secondary shearing force is created by the work piece 74 in a direction parallel to walls 84b and 94b and perpendicular to walls 84a and 94a. It is the purpose of wall 84a to counteract this shearing force and prevent the ceramic strip wearing portion 80 from sliding off base portion 82.

Lateral work guides 70 and 72 are formed in a manner similar to work blade 22. The work guides 70 and 72 have wearing surfaces 70a and 72b formed on hard wearing portions 100 and 102 which are preferably ceramic, fastened to relatively resilient base portions 104 and 106, respectively, which are preferably a paper phenolic compound as used in the work blade 22. As in the work blade 22, the preferred method of uniting the wearing portions 100 and 102 with their respective base portions 104 and 106 is with an epoxy resin adhesive 108.

It will be apparent to those skilled in the art that applicants have provided a new and novel construction for work blades and work guides for use in centerless grinding machines. It will also be appreciated that the work blade and work guides described herein, contain desirable qualities not heretofore found in any single work blade or work guide.

While the invention has been shown and described herein in what is conceived to be the most practical and preferred embodiments, it is recognized that departures may be made therefrom within the scope of the invention which is not to be limited to the details disclosed herein but is to be accorded the full scope of the claims so as to embrace any and all equivalent devices.

What is claimed is:

1. A work blade mounted on a centerless grinding machine adapted to receive and orient a work piece between the grinding wheel and the regulating wheel of said centerless grinding machine, said work blade comprising: a high density, low porosity ceramic strip wearing surface portion which provides a bearing surface for the work piece and is adapted to be angularly received by a base portion of said blade and united therewith; a phenolic based base portion of said work blade having a length longer than its height and a width narrower than its height, the top of said base portion having an angular groove therein running its entire length and adapted to receive said wearing surface portion of said work blade and to fixedly contact two adjacent sides of said ceramic strip wearing surface portion, said base portion material being sufficiently resilient relative to said wearing surface portion to serve as a dampening means therefor.

2. Work guide means adapted to be mounted in upright opposing relationship on a centerless grinding machine to maintain a work piece in a laterally fixed relationship in said centerless grinding machine, said guide means each comprising a wearing surface portion of high density ceramic adapted to contact and bear against said work piece and mounted on a base portion, said base portion being a shock absorbing and vibration dampening phenolic based material.

3. A guide means to be mounted on a centerless grinding machine adapted to receive and orient a work piece to be rotatably finished on said centerless grinding machine, said guide means comprising: a pair of lateral guides positioned with upright opposing bearing surfaces adapted to maintain said work piece between them and to restrict lateral movement of said work piece, said guides having a ceramic wearing surface mounted on a phenolic base portion and affixed thereto; a work blade mounted on said centerless grinding machine adapted to provide a bottom rest for and to maintain said work piece in a fixed relationship to the grinding and regulating wheels of said centerless grinding machine, said work blade having a ceramic strip wearing surface angularly mounted on a phenolic based base portion and affixed thereto.

4. Work guide means for a centerless grinding machine comprising: a work blade adapte to be disposed in said grinding machine as a supporting rest structure underneath the work piece to be ground by said machine, wherein said work piece is axially elongated and aligned parallel with the axes of a grinding wheel and a regulator wheel of said grinding machine, which engage opposing sides of said work piece to rotate and grind said work piece, said work blade being characterized as an elongated, flat, substantially parallel-sided structure of greater height than thickness, wherein an elongated, smooth, planar upper wearing surface thereof upon which said work piece is to rest is slanted relative to a horizontal plane so that when in operative position a major component of force is transmitted perpendicularly, and a secondary component of force is transmitted parallel to the wearing surface of said blade from said work piece, and wherein said blade is formed of a wearing portion comprising a strip of hard, dense, relatively low porosity material which provides the entire wearing surface for said blade, and a base portion of relatively flexible material having sufficient rigidity to prevent misalignment of a work piece supported by said blade when being ground, but enough flexibility to substantially dampen vibrations therefrom, said base portion having a groove in its top surface adapted to receive said wearing portion, said groove having a slanting floor section section extending from one side of said blade and parallel with the wearing surface of said wearing portion to dampen the major component of force transmitted perpendicular thereto from a work piece mounted thereon, and an end wall extending normal to said floor section to the opposite side of the blade therefrom to dampen a secondary shearing component of force transmitted parallel to said wearing surface from a work piece mounted thereon, and a pair of lateral work guides mounted in a centerless grinding machine on opposing sides of a work piece being ground therein, said work guides having flat wearing surfaces disposed to bear against the opposing sides of said work piece and hold it in place when rotated, said guides being formed of a wearing portion upon which is disposed the wearing surface and a base portion joined with the wearing portion of the guides, said wearing portion of the guides being made of a hard, dense, relatively low porosity material, said base portion of the guides of relatively flexible material, adapted to dampen lateral components of force transmitted to said wearing portion of the guides, and said wearing portions of the work guide means are ceramic and said base portions are a phenolic plastic.

5. Work guide means mounted on a centerless grinding machine adapted to receive and orient a work piece to be rotatably finished on said centerless grinding machine, comprising: a wearing surface portion engageable by said work piece for rotation thereon, said wearing surface portion being of a relatively dense and hard material wherein rotation of said work piece will cause relatively minor wear of said wearing surface portion, a base portion of said work guide means affixed to said wearing surface portion and adapted to be received and maintained in said centerless grinding machine, said base portion being of a relatively durable, flexible shock absorbing material wherein vibration transmitted to said base portion from said centerless grinding machine will be dampened and disorientation of said work piece during the finishing thereof will be minimized, wherein said base portion is adapted to be received and maintained in said centerless grinding machine and wherein said base portion is a phenolic base material having a sufficient degree of flexibility to dampen vibrations imparted thereto by said centerless grinding machine.

References Cited

UNITED STATES PATENTS

| | | | |
|---|---|---|---|
| 2,581,226 | 1/1952 | Arnold | 51—238 |
| 2,730,845 | 1/1956 | Ernst | 51—238 X |
| 2,743,555 | 5/1956 | Irvine | 51—103 |
| 3,298,140 | 1/1967 | Enyeart | 51—103 |

LESTER M. SWINGLE, *Primary Examiner.*

U.S. Cl. X.R.

51—238